(12) United States Patent
Malvasi et al.

(10) Patent No.: US 7,678,848 B2
(45) Date of Patent: Mar. 16, 2010

(54) PROCESS FOR PREPARING FLUOROPOLYMER DISPERSIONS

(75) Inventors: Marco Malvasi, Alessandria (IT); Valeri Kapeliouchko, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 551 days.

(21) Appl. No.: 11/319,804

(22) Filed: Dec. 29, 2005

(65) Prior Publication Data
US 2006/0148973 A1 Jul. 6, 2006

(30) Foreign Application Priority Data
Dec. 30, 2004 (IT) .......................... MI2004A2554

(51) Int. Cl.
*C08L 1/00* (2006.01)
(52) U.S. Cl. ...................... 523/310; 524/544; 524/700; 524/800; 524/895; 526/249; 526/250
(58) Field of Classification Search ................ 523/310; 524/544, 700, 800, 895; 526/249, 250
See application file for complete search history.

(56) References Cited

U.S. PATENT DOCUMENTS

| 2,559,752 A | 7/1951 | Berry |
| 3,037,953 A | 6/1962 | Marks et al. |
| 3,271,341 A | 9/1966 | Garrison, Jr. |
| 3,301,807 A | 1/1967 | Hoashi |
| 3,536,643 A | 10/1970 | Stryker et al. |
| 3,704,272 A | 11/1972 | Holmes |
| 4,369,266 A | 1/1983 | Kuhls et al. |
| 4,380,618 A | 4/1983 | Khan et al. |
| 4,864,006 A | 9/1989 | Giannetti et al. |
| 4,990,283 A | 2/1991 | Visca et al. |
| 5,789,508 A | 8/1998 | Baker et al. |
| 6,136,893 A * | 10/2000 | Yamashita et al. .......... 523/310 |
| 6,218,464 B1 * | 4/2001 | Parker et al. ................ 524/805 |
| 6,297,334 B1 | 10/2001 | Marchese et al. |
| 6,479,591 B2 | 11/2002 | Kapeliouchko et al. |
| 6,518,352 B1 | 2/2003 | Visca et al. |
| 6,576,703 B2 | 6/2003 | Kapeliouchko et al. |
| 6,794,550 B2 | 9/2004 | Hintzer et al. |
| 6,833,403 B1 | 12/2004 | Blaedel et al. |
| 6,861,466 B2 * | 3/2005 | Dadalas et al. .............. 524/544 |
| 7,041,728 B2 * | 5/2006 | Zipplies et al. ............. 524/544 |
| 2003/0153674 A1 | 8/2003 | Visca et al. |
| 2003/0220442 A1 | 11/2003 | Epsch et al. |
| 2004/0167236 A1 * | 8/2004 | Grootaert et al. .............. 521/28 |

FOREIGN PATENT DOCUMENTS

| EP | 1 155 055 B1 | 11/2001 |
| EP | 1364972 A1 * | 11/2003 |
| EP | 1526142 A1 * | 4/2005 |
| EP | 1538177 A1 * | 6/2005 |
| WO | WO 03/051988 A2 | 6/2003 |

OTHER PUBLICATIONS

Kirk-Othmer, Encyclopedia of Chemical Technology, 14, 1995; pp. 737-783.

* cited by examiner

*Primary Examiner*—Peter D. Mulcahy
*Assistant Examiner*—Henry Hu
(74) *Attorney, Agent, or Firm*—Arent Fox LLP

(57) ABSTRACT

A process to substantially remove fluorinated anionic surfactants from fluoropolymer dispersions comprising the following steps:
a) addition to the fluoropolymer dispersion of one or more non fluorinated surfactants;
b) contact of the dispersion with an anionic exchanger;
c) separation of the dispersion from the anionic exchanger and recovery of the dispersion substantially fluorinated anionic surfactant free.

37 Claims, No Drawings

PROCESS FOR PREPARING FLUOROPOLYMER DISPERSIONS

The present invention relates to a process for preparing fluoropolymer aqueous dispersions substantially fluorinated surfactant free, in particular fluorinated ionic surfactant free.

More specifically the present invention relates to a process for preparing aqueous dispersions of fluoropolymers substantially perfluorooctanoate free in the form of acid or its salts.

With aqueous dispersions of fluoropolymers substantially fluorinated anionic surfactant free it is meant that the fluorinated surfactant content, referred to the fluoropolymer weight, is lower than 100 ppm, in particular lower than 50 ppm, more in particular lower than 5 ppm.

It is well known in the prior art for the production of fluorinated polymers there are two different polymerization processes: the suspension polymerization and the emulsion polymerization. In suspension polymerization polymer granules having millimetric sizes are obtained. In emulsion polymerization a colloidal aqueous dispersion is obtained having particle diameters of the order from some nanometers, generally from 10 nm, to hundreds of nanometers, from 100 nm to 400 nm. The fluoropolymer emulsion polymerization process is carried out with a mild stirring and in the presence of surfactants not acting as chain transfer agent to avoid to obtain low molecular weight fluoropolymers and therefore with poor mechanical properties. Said surfactants are called non telogenic surfactants, see for example U.S. Pat. No. 2,559,752. Salts of perfluoroalkanoic acid, in particular the ammonium salt and/or alkaline metal salts of the perfluorooctanoic acid, indicated hereinafter as PFOA, are industrially very often used. Other anionic (per)fluorinated surfactants are also used, see for example U.S. Pat. No. 3,271,341, U.S. Pat. No. 4,380,618, U.S. Pat. No. 4,864,006, U.S. Pat. No. 5,789,508. The PFOA is the most industrially used surfactant in the emulsion polymerization since it is not telogen, thus allowing to obtain dispersions of fluorinated polymers having high molecular weight and allows to obtain stable dispersions for long periods of time. It is also known that in the applications of fluoropolymer dispersions, as coating or in the impregnation of fibers, in particular glass fibers, said fluorinated surfactants can reach the environment, for example through the washing effluents, or disperse in the atmosphere during the drying and/or sintering steps. However some of said surfactants have been classified as dangerous for the environment and are characterized by a low bioelimination rate from the human body. For example, the PFOA seems to belong to the surfactants particularly dangerous for the environment and with long residence times in men. Therefore there is a request from users of fluoropolymer dispersions substantially fluorinated anionic surfactant free and in particular PFOA free.

The fluoropolymer dispersions are obtained from the emulsion polymerization process with a concentration of the fluorinated polymer between 20% and 35% by weight referred to 100 parts by weight of the dispersion.

The fluoropolymer dispersions obtained from the polymerization process can be subjected to post-treatments to obtain concentrated fluoropolymer dispersions, even up to 75% w/w. The concentration processes can be carried out, for example, by decantation, as described, for example, in U.S. Pat. No. 3,037,953, U.S. Pat. No. 3,704,272 and U.S. Pat. No. 3,301,807. Another concentration process of the fluoropolymer dispersions is the so called ultrafiltration process, as described for example in U.S. Pat. No. 4,369,266 and U.S. Pat. No. 6,136,893. In U.S. Pat. No. 4,369,266 a variant of the ultrafiltration process is described, allowing to obtain fluoropolymer aqueous dispersions substantially fluorinated anionic surfactant free, for example PFOA free. The process is based on the dialysis of the fluoropolymer dispersions and the permeate is purified from PFOA by using anionic exchange resins. This process can be industrially carried out. The drawback is that the dialysis process is slow, in particular for obtaining fluoropolymer dispersions having a very low PFOA content, lower than 10 ppm referred to the polymer weight. It is also known a process for obtaining polymeric dispersions substantially PFOA free by direct contact with anionic exchange resins of the dispersion stabilized with a nonionic surfactant. See, for example, U.S. Pat. No. 3,536,643, EP 1,155,055, WO 03/051988, US 2003/0220442.

In U.S. Pat. No. 6,794,550 a process is described for obtaining dispersions substantially PFOA free by distillation of the dispersion with a pH between 1 and 3. Said process has the drawback to bring a strong destabilization of the dispersion and a high probability of coagulum formation. Furthermore there is the drawback that a remarkable foam amount is formed causing problems for the run of an industrial process.

The fluoropolymer dispersions obtainable by an emulsion, or microemulsion polymerization process, generally have the following characteristics:

particle diameter from 10 nm to 400 nm, preferably from 20 nm to 300 nm;

fluoropolymer concentration from 10% to 45% by weight, preferably from 20% to 35%;

amount of fluorinated anionic surfactant in the range from 800 ppm to 200,000 ppm, preferably from 1,200 ppm to 6,000 ppm referred to the polymer weight.

From the industrial point of view the polytetrafluoroethylene (PTFE) dispersions obtainable by an emulsion polymerization process typically have an average particle diameter from 180 nm to 400 nm, preferably from 200 nm to 300 nm, still more preferably from 220 nm to 280 nm. The amount of fluorinated anionic surfactant is from about 2,500 ppm to about 5,000 ppm, preferably from 3,000 ppm to 4,000 ppm, referred to the polymer weight. Processes to obtain polytetrafluoroethylene (PTFE) dispersions having a diameter from 10 nm to 100 nm, preferably from 20 nm to 80 nm, still more preferably from 30 nm to 70 nm, for example by microemulsion polymerization, are known in the prior art. See for example U.S. Pat. No. 6,297,334. Typically said dispersions contain an amount of fluorinated anionic surfactant from about 800 ppm to about 200,000 ppm, preferably from 1,200 ppm to 40,000 ppm referred to the polymer weight.

For industrial applications, said dispersions are concentrated, for example by heating in the presence of a nonionic surfactant or by ultrafiltration, to a solid content up to 75% of fluoropolymer, see the above references.

With the processes indicated in the above patents to remove PFOA, as said, a nonionic surfactant, generally an ethoxylated alkylphenol or an ethoxylated aliphatic alcohol, is added. For example Triton® X100 and Genapol® X-080 are used.

A drawback of these dispersions is that they cannot be coagulated with the usual procedures used for the fluoropolymer dispersions, in particular of PTFE.

The need was felt to have available fluoropolymer dispersions substantially fluorinated anionic surfactant free, and coagulable.

It has been found by the Applicant a process solving the above technical problem.

It is an object of the present invention a process to substantially remove fluorinated anionic surfactants from fluoropolymer dispersions comprising the following steps:

a) addition to the fluoropolymer dispersion of one or more non fluorinated anionic surfactants;

b) contact of the dispersion with an anionic exchanger;
c) separation of the dispersion from the anionic exchanger and recovery of the dispersion substantially fluorinated anionic surfactant free.

Preferably, before step a) the pH of the fluoropolymer dispersion is adjusted to a pH value in the range from 7 to 12, preferably from 8 to 10. The base used can be a strong or weak, organic or inorganic base; an inorganic base, still more preferably an ammonia aqueous solution is preferably used.

The fluoropolymer dispersion used in the process of the present invention is obtained by an emulsion or microemulsion polymerization process. The fluoropolymer concentration is generally in the range 10%-45%, preferably 20%-35%.

The non fluorinated anionic surfactants usable in step a) of the process of the present invention are anionic surfactants having a linear or branched structure, having one or more anionic groups, preferably one group. The surfactants generally have an equivalent weight, defined as molecular weight/number of anionic groups present in the surfactant, higher than 350, preferably higher than 600. Generally the equivalent weight of the anionic surfactants usable in the process of the present invention is lower than 5,000, more preferably lower than 3,000, still more preferably lower than 1,500.

The molecular weight of the anionic surfactants is higher than 350, preferably higher than 400, still more preferably higher than 600. Generally the molecular weight of said anionic surfactants is lower than 5,000, more preferably lower than 3,000, still more preferably lower than 1,500.

The anionic groups present in the molecule of said surfactants are preferably selected from carboxylates, sulphates, sulphonates, phosphates, phosphonates; more preferably carboxylates, sulphates, sulphonates.

The anionic surfactants usable in the process of the invention are preferably selected from the following classes of compounds:

anionic surfactants having the following general formula:

$$Y'-(P^1)_n-CH(Y)-(P^2)_{n'}-Y'' \quad (1)$$

wherein:
Y, Y' and Y'' are anionic or nonionic groups, with the proviso that at least one of Y, Y' or Y'' is an anionic group and at least one of the remaining of Y, Y' or Y'' is a nonionic group;
$P^1$ and $P^2$, equal or different, are linear or branched, when possible, alkylene groups, optionally containing one or more unsaturations, when possible, having a number of carbon atoms from 1 to 10, preferably from 1 to 6;
n and n', equal or different, are zero or 1;
anionic surfactants having the following general formula:

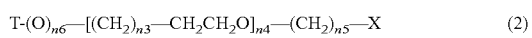

$$T-(O)_{n6}-[(CH_2)_{n3}-CH_2CH_2O]_{n4}-(CH_2)_{n5}-X \quad (2)$$

wherein:
$T=C_{4-18}$ alkyl, or aryl wherein one or more hydrogen atoms are substituted with $C_{4-18}$, preferably $C_{6-12}$, aliphatic chains;
n3, n6, equal to or different from each other, are integers equal to 0 or 1;
n4 is an integer and ranges from 0 to 100, preferably from 1 to 50, still more preferably from 2 to 30;
n5 is an integer from 0 to 10, preferably from 0 to 1;
X is an anionic group selected from $COO^-$, $SO_3^-$;
with the proviso that when n5=0 $X=SO_3^-$.

The preferred anionic groups in the surfactants of formula (1) are selected from $SO_3^-$, $HPO_3^-$ and $COO^-$. The corresponding cations are generally selected from $H^+$ or from those of the alkaline metals, ammonium ion or substituted ammonium; the most preferred anionic group is $SO_3^-$ salified with a cation of an alkaline metal, ammonium ion or substituted ammonium.

The preferred nonionic groups in the surfactants of formula (1) are selected from the following:

COOR, CONHR, CONH$_2$, CONRR', wherein
R and R' equal or different, have the following meanings:
$C_2$-$C_{20}$, preferably $C_5$-$C_{15}$, more preferably $C_7$-$C_{15}$, hydrogenated alkyls linear or branched, saturated or containing at least one unsaturation, preferably of ethylene type; when the alkyl has a number of carbon atoms of at least 6, it can contain one or more aromatic rings; in the alkyl group one or more hydrogen atoms can be substituted by fluorine or chlorine atoms, the hydrogenated (hydrocarbon) alkyl groups are preferred;
siloxane alkyl groups, wherein the alkyl contains from 1 to 7 carbon atoms, preferably the alkyl is methyl.

In the surfactants of formula (1) COOR is preferred among the nonionic groups, wherein R is as above; when in the compound of formula (1) two nonionic groups COOR are present, the alkyl group in each of COOR group can be equal to or different from the other.

Preferably in formula (1) Y is an anionic group and Y', Y'' are nonionic groups, equal to or different from each other; one between n and n' has the value of 1 and the other of zero; when n or n' is different from zero, $P^1$ or $P^2$ is methylene.

Among the surfactants of formula (1) those having the following structures are preferred:
$C_{10}H_{21}OOC-CH_2-CH(SO_3^-)-COOC_{10}H_{21}$ di-isodecylsulphosuccinate sodium salt, known with the trademark EMULSOGEN® SB10 (Clariant®);
$C_{13}H_{27}OOC-CH_2-CH(SO_3Na)-COOC_{13}H_{27}$ di-isotridecylsulphosuccinate sodium salt, known with the trademark POLIROL® TR/LNA; (CESALPINIA® Chemicals).

The counterions of the surfactants of formula (2) are generally those indicated above for the anionic surfactants of formula (1).

Among the surfactants of formula (2) those having the following structures are preferred:
$(C_9H_{17})_2-C_6H_1-O-[CH_2CH_2O]_{15-20}-(CH_2)-$COOH carboxylic dinonylphenolpolyethylenglycolether acid, known with the trademark Marlowet®4530 (Sasol);
$(C_{12-14}H_{25-29})-O-[CH_2CH_2O]_{10}-(CH_2)-COONa$ $C_{12}$-$C_{14}$-alcohol polyethylenglycol ether (10EO) carboxymethylated sodium salt, known with the trademark Marlinat® 105/80 (Sasol);
$(C_{12-14}H_{25-29})-O-[CH_2CH_2O]_3-SO_3Na$ $C_{12}$-$C_{14}$-alcohol polyethylenglycol ether (3EO) sodium salt sulphate known with the trademark Cosmacol® AES-27-3-24 NE (Sasol).

In the present invention one or more surfactants of the above classes can also be used.

In step a) the anionic surfactant is added in an amount generally comprised between 1% and 10%, preferably between 2% and 5%, still more preferably between 2.5% and 4%, in percent by weight referred to the fluoropolymer weight. The surfactant amount generally depends on the type of anionic surfactant used. With routine tests it is easy to determine the minimum amount sufficient to obtain the results of the invention and without substantial coagulum phenomena.

Among the anionic exchange resins usable in step b) of the process of the present invention, the anionic exchange resins described in "Kirk-Othmer—Encyclopedia of Chemical Technology", vol. 14, pages 737-783, J. Wiley & Sons, 1995, can be mentioned. Among the preferred anionic exchange resins, the resins containing a tertiary or quaternary ammonium group can be mentioned. Among the preferred commercial resins, Amberjet® 4400 OH (Rohm&Haas) and Dowex® MSA 1-C (Dow) can be mentioned. The ionic exchange resins to be used in the process of the present invention can be strongly basic, average basic, weakly basic type. Preferably a strongly basic resin is used.

Step b) can be carried out in a continuous or discontinuous way, preferably in a discontinuous way. For example step b) can be carried out by addition of the anionic exchanger, under the form of granules having sizes of about 300-400 micrometers. The amount added is generally of the order from 1% to 10% by weight with respect to the dispersion weight.

In the discontinuous process the mixture formed of the fluoropolymer dispersion containing the surfactant of the invention and of the ionic exchange resin is stirred, for example in a tank, for a time sufficient to remove the fluorinated surfactant up to the desired value, for example lower than 5 ppm, and then the fluoropolymer dispersion is separated from the resin, for example by filtration.

Another embodiment of the process of the invention is to pass the fluoropolymer dispersion on a column filled with the ionic exchange resin of step b). In this embodiment a continuous way is preferably used.

In a continuous process, the fluoropolymer dispersion from which the fluorinated surfactant has to be removed, is fed through a column filled with the ionic exchange resin, or through more columns in series. The process can be repeated one or more times up to the desired fluorinated surfactant value. It is also possible to operate with a semicontinuous process, wherein the mixture formed of the dispersion of the invention fluoropolymers and the ionic exchange resin, fed into a tank kept under stirring, is maintained under stirring for a time sufficient to remove the fluorinated surfactant at the desired value. Then the fluoropolymer dispersion is discharged from the tank and contemporaneously separated, for example by filtration, from the resin, and a new dispersion to be treated is added to the tank.

In step b) the contact time between the polymeric dispersion and the anionic exchanger is generally lower than 24 hours, preferably lower than 8 hours, still more preferably lower than 4 or 2 hours.

The process of the present invention is generally carried out at temperatures between 5° C. and 45° C.

It has been surprisingly and unexpectedly found by the Applicant that the process of the invention allows to obtain fluoropolymer dispersions substantially fluorinated anionic surfactants free. Furthermore the productivity is high. In the process of the invention there are surprisingly no substantial fluoropolymer losses owing to coagulum formation. The used anionic surfactant substantially remains in the fluoropolymer dispersion.

The results obtained with the process of the invention are surprising and unexpected since one would have expected that the anionic surfactant was removed from the dispersion during the contact with the anionic exchange resins, likewise it occurs for the anionic fluorinated surfactant present in the starting dispersion, and therefore the dispersion coagulation was obtained.

As said, with the process of the present invention substantially fluorinated anionic surfactant free aqueous fluoropolymer dispersions, in particular perfluoroctanoate free in the form of acids or its salts, are obtained. With fluoropolymer aqueous dispersions substantially fluorinated surfactants free it is meant that the fluorinated surfactant content, referred to the fluoropolymer weight, is lower than 100 ppm, in particular lower than 50 ppm, more in particular lower than 5 ppm.

The polymerization processes to obtain the fluoropolymer dispersions usable in the process of the present invention are the emulsion or microemulsion polymerization processes.

The emulsion polymerization processes are described in the following patents: U.S. Pat. No. 2,559,752, U.S. Pat. No. 4,380,618, U.S. Pat. No. 5,789,508, U.S. Pat. No. 6,479,591, U.S. Pat. No. 6,576,703 and in the patent application US 2003/0153674.

The microemulsion polymerization processes are described in the following patents in the name of the Applicant: U.S. Pat. No. 4,864,006 and U.S. Pat. No. 6,297,334. The microemulsions usable in the microemulsion polymerization processes are described in U.S. Pat. No. 4,864,006 and U.S. Pat. No. 4,990,283.

The dispersion fluoropolymers used in the process of the present invention are for example:

tetrafluoroethylene (TFE) homopolymers and TFE copolymers with monomers having at least one unsaturation of ethylene type;

thermoprocessable fluoropolymers (from the melt) based on TFE as PFA, MFA, FEP and ETFE;

VDF-based homopolymers and copolymers;

CTFE-based homopolymers and copolymers, for example PCTFE and E/CTFE copolymer;

VDF-based fluoroelastomers:

VDF/HFP, optionally containing TFE and/or vinylethers selected from perfluoroalkylvinylethers and/or perfluoroalkoxyalkylvinylethers; optionally containing hydrogenated olefins as ethylene and propylene;

TFE-based (per)fluoroelastomers:

TFE copolymers with vinylethers selected from perfluoroalkylvinylethers and/or perfluoroalkoxyalkylvinylethers; in particular TFE/PMVE, TFE/PEVE, TFE/PPVE;

TFE copolymers with hydrogenated olefins, preferably ethylene and/or propylene;

TFE and/or VDF amorphous and/or crystalline fluoropolymers containing dioxole rings having 5-7 atoms, in particular those obtained by copolymerization with (per)fluorodioxoles or with dienic monomers giving dioxole rings by cyclization.

The tetrafluoroethylene (TFE) copolymers with monomers having at least one unsaturation of ethylene type comprise comonomers of hydrogenated and fluorinated type. The comonomer amount is preferably lower than 3% by weight, preferably lower than 1% to have non thermoprocessable copolymers (the so called modified PTFE).

Among the hydrogenated comonomers, i.e. comonomers not containing fluorine, ethylene, propylene, acrylic monomers, for example methylmethacrylate, (meth)acrylic acid, hydroxyethylenacrylate, styrene monomers as, for example, styrene, can be mentioned.

Among the fluorinated comonomers it can be mentioned:

$C_3$-$C_8$ perfluoroolefins, as hexafluoropropene (HFP);

$C_2$-$C_8$ hydrogenated fluoroolefins, as vinyl fluoride (VF), vinylidene fluoride (VDF), trifluoroethylene, $CH_2$=$CH$—$R_{f0}$ perfluoroalkylethylene, wherein $R_{f0}$ is a $C_1$-$C_6$ perfluoroalkyl;

$C_2$-$C_6$ chloro- and/or bromo- and/or iodo-fluoroolefins, as chlorotrifluoroethylene (CTFE);

$CF_2=CFOR_{f0}$ (per) fluoroalkykvinylethers (PAVE), wherein $R_{f0}$ is a $C_1$-$C_6$ (per) fluoroalkyl, for example $CF_3$, $C_2F_5$, $C_3F_7$;

$CF_2=CFOX_0$ (per) fluorooxyalkylvinylethers, wherein $X_0$ is a $C_1$-$C_{12}$ alkyl, or a $C_1$-$C_{12}$ oxyalkyl, or a $C_1$-$C_{12}$ (per) fluorooxyalkyl having one or more ether groups, for example perfluoro-2-propoxy-propyl;

fluorodioxoles, preferably perfluorodioxoles.

The preferred fluoropolymers of the dispersions obtainable by emulsion or microemulsion polymerization, usable in the process of the present invention, are the TFE copolymers or the TFE homopolymers. The fluorinated anionic surfactant removed with the process of the invention is preferably PFOA.

The starting dispersion can be monomodal or bi- or multimodal. For the bi- and multimodal dispersions see for example U.S. Pat. No. 6,576,703, U.S. Pat. No. 6,518,352 in the name of the Applicant.

As said, the process of the present invention is characterized by a high productivity and substantially without fluoropolymer losses.

The fluoropolymer dispersions essentially fluorinated anionic surfactant free obtained with the process of the present invention are characterized by a good storage stability and can be used in the usual fluoropolymer applications. The dispersions obtainable with the process of the invention, as such or formulated, can also be used for the coating of surfaces of organic and/or inorganic polymers, of metals or ceramics; for the impregnation of fibers, preferably glass fibers, the production of cast film, for the additivation of polymers or inorganic materials, etc.

The dispersions obtainable with the process of the present invention can be formulated with non ionic, anionic, cationic, amphoteric surfactants; with organic or inorganic compounds and/or fillers for example of inorganic type; with solvents; tixotropic agents; biocides; resins, for example acrylic, silicone, polyamidoimidic resins; polyethylenglycol, and other known additives of the prior art.

The dispersions obtainable with the process of the invention can be subjected to the conventional post-treatment processes as, for example, concentration by ultrafiltration or clouding processes. See U.S. Pat. No. 4,369,266, U.S. Pat. No. 3,037,953, U.S. Pat. No. 3,704,272, U.S. Pat. No. 3,301,807.

A further object of the present invention are fluoropolymer dispersions substantially fluorinated anionic surfactant free, obtainable according to the process of the present invention, comprising non fluorinated anionic surfactants according to the present invention. These dispersions are stable. Non ionic surfactants as ethoxylated alkylphenols and ethoxylated alcohols can optionally be added, even if not necessary. These dispersions can be formulated as described above.

The following Examples illustrate with non limitative purposes the present invention.

EXAMPLES

The percentages reported in the following Examples are percentages by weight, where not otherwise indicated. The solutions of the non fluorinated anionic surfactants are prepared by starting from the corresponding commercial products by the usual laboratory methods. In the particular case of the anionic surfactant known with the commercial name Marlowet® 4530 the solution has been prepared by neutralization with ammonia.

The PFOA is determined by gas chromatography.

Example 1

Emulsion Polymerization 11 grams of the ammonium perfluorooctanoate aqueous solution at 100 g/litre concentration and 31 litre of properly degassed demineralized water are introduced into a 50 litre autoclave equipped with mechanical stirrer and previously put under vacuum. In the reactor also 140 grams of paraffin having a softening point between 52° C.-54° C. were previously introduced. The autoclave is kept under mechanical stirring and is pressurized with TFE up to a pressure of 20 bar at a temperature of 68° C. At this point 500 ml of a solution of $(NH_4)_2S_2O_8$ (APS) and disuccinic peroxide (DSAP) corresponding to 400 mg of APS and 2,000 mg of DSAP are fed into the autoclave.

When the pressure in the reactor has decreased of 0.5 bar, one starts to feed TFE by means of a compressor so as to maintain a constant pressure of 20 bar inside the reactor. In the meantime the internal temperature of the reactor is increased up to 78° C. at a 0.5° C./min rate. During the reaction 50.6 g of the aqueous solution at 100 g/litre of ammonium perfluorooctanoate are fed into the autoclave. After 90 minutes, the TFE feeding is interrupted, when 15,800 grams of TFE have reacted, the reactor vented and cooled. The discharged latex has a solid content equal to 30% w/w and the pH is equal to 3.9.

The average diameter of the polymer primary particles measured by Laser Light Scattering (LLS) is equal to 240 nm.

The PFOA content is 3,900 ppm with respect to the polymer.

Example 2 (Comparative)

To 500 g of the dispersion obtained according to the Example 1, the pH of which was adjusted at about 9 with an ammonia aqueous solution, 5% by weight of ionic exchange resin Amberjet® 4400 OH is added, referred to the sample weight. The mixture is put under mild stirring with a two-blade mechanical stirrer. Already after one hour from the beginning of the treatment, the dispersion appears coagulated.

Example 3

Starting from 500 g of the dispersion obtained according to the Example 1, the pH of which was adjusted at about 9 with an ammonia aqueous solution, and from an aqueous solution at 5% of Cosmacol® AES 27-3-24, a dispersion sample containing 4% of Cosmacol® AES 27-3-24, referred to the PTFE weight, is prepared, by mixing in a beaker. The PTFE content of the so obtained sample is equal to 24.2% by weight. To said sample 5% by weight of ionic exchange resin Amberjet® 4400 OH, referred to the sample weight, is added. The mixture is maintained under mild stirring with a two-blade mechanical stirrer for 4 hours. At the end the dispersion, which appears fluoropolymer coagulum free, is separated from the resins by filtration through a 150 μm mesh net. The PTFE content of the obtained dispersion is equal to 24.2% by weight. The PFOA content, referred to the PTFE weight, is lower than 5 ppm.

Example 4

Starting from 500 g of the dispersion obtained according to the Example 1, the pH of which was adjusted at about 9 with an ammonia aqueous solution, and from an aqueous solution at 5% of Marlinat® 105/80, a dispersion sample containing 2% of Marlinat® 105/80, referred to the PTFE weight, is prepared, by mixing in a beaker. The PTFE content of the so obtained sample is equal to 26.8% by weight. To said sample 5% by weight of ionic exchange resin Amberjet® 4400 OH, referred to the sample weight, is added. The mixture is maintained under mild stirring with a two-blade mechanical stirrer for 8 hours. At the end the dispersion, which appears fluoropolymer coagulum free, is separated from the resins by filtration through a 150 μm mesh net. The PTFE content of the obtained dispersion is equal to 26.8% by weight. The PFOA content, referred to the PTFE weight, is lower than 5 ppm.

Example 5

Starting from 500 g of the dispersion obtained according to the Example 1, the pH of which was adjusted at about 9 with an ammonia aqueous solution, and from an aqueous solution at 5% of Marlowet® 4530, a dispersion sample containing 2% of Marlowet® 4530, referred to the PTFE weight, is prepared, by mixing in a beaker. The PTFE content of the so obtained sample is equal to 26.8% by weight. To said sample 5% by weight of ionic exchange resin Amberjet® 4400 OH, referred to the sample weight, is added. The mixture is maintained under mild stirring with a two-blade mechanical stirrer for 2 hours. At the end the dispersion, which appears fluoropolymer coagulum free, is separated from the resins by filtration through a 150 μm mesh net. The PTFE content of the obtained dispersion is equal to 26.8% by weight. The PFOA content, referred to the PTFE weight, is lower than 5 ppm.

Example 6

Starting from 500 g of the dispersion obtained according to the Example 1, the pH of which was adjusted at about 9 with an ammonia aqueous solution, and from an aqueous solution at 5% of Marlowet® 4530, a dispersion sample containing 1% of Marlowet® 4530, referred to the PTFE weight, is prepared, by mixing in a beaker. The PTFE content of the so obtained sample is equal to 28.3% by weight. To said sample 5% by weight of ionic exchange resin Amberjet® 4400 OH, referred to the sample weight, is added. The mixture is maintained under mild stirring with a two-blade mechanical stirrer for 8 hours. At the end the dispersion, which appears fluoropolymer coagulum free, is separated from the resins by filtration through a 150 μm mesh net. The PTFE content of the obtained dispersion is equal to 28.3% by weight. The PFOA content, referred to the PTFE weight, is lower than 5 ppm.

Example 7

Starting from 500 g of the dispersion obtained according to the Example 1, the pH of which was adjusted at about 9 with an ammonia aqueous solution, and from an aqueous preparation at 5% of Polyrol® TR/LNA, a dispersion sample containing 2.5% of Polyrol® TR/LNA, referred to the PTFE weight, is prepared, by mixing in a beaker. The PTFE content of the so obtained sample is equal to 26.1% by weight. To said sample 5% by weight of ionic exchange resin Amberjet® 4400 OH, referred to the sample weight, is added. The mixture is maintained under mild stirring with a two-blade mechanical stirrer for 2 hours. At the end the dispersion, which appears fluoropolymer coagulum free, is separated from the resins by filtration through a 150 μm mesh net. The PTFE content of the obtained dispersion is equal to 26.1% by weight. The PFOA content, referred to the PTFE weight, is lower than 5 ppm.

Example 8 (Comparative)

Treatment with resins of a polymeric dispersion in the presence of an anionic surfactant having equivalent weight lower than the limits of the present invention.

Starting from 500 g of the dispersion obtained according to the Example 1, the pH of which was adjusted at about 9 with an ammonia aqueous solution, and from an aqueous solution at 5% of sodium dodecylsulphate, a dispersion sample containing 1.5% of sodium dodecylsulphate, referred to the PTFE weight, is prepared by mixing in a beaker. The PTFE content of the so obtained sample is equal to 27.5% by weight. To said sample 5% by weight of ionic exchange resin Amberjet® 4400 OH, referred to the sample weight, is added. The mixture is maintained under mild stirring with a two-blade mechanical stirrer. Already after one hour from the beginning of the treatment the dispersion appears coagulated.

Example 9 (Comparative)

Starting from 500 g of the dispersion obtained according to the Example 1, the pH of which was adjusted at about 9 with an ammonia aqueous solution, and from an aqueous solution at 5% of sodium dodecylsulphate, a dispersion sample containing 3% of sodium dodecylsulphate, referred to the PTFE weight, is prepared by mixing in a beaker. The PTFE content of the so obtained sample is equal to 25.4% by weight. To said sample 5% by weight of ionic exchange resin Amberjet® 4400 OH, referred to the sample weight, is added. The mixture is maintained under mild stirring with a two-blade mechanical stirrer. Already after one hour from the beginning of the treatment the dispersion appears coagulated.

The invention claimed is:
1. A process to remove fluorinated anionic surfactants from fluoropolymer dispersions comprising the following steps:
   a) addition to the fluoropolymer dispersion of one or more non fluorinated anionic surfactants;
   b) contact of the dispersion with an anionic exchanger;
   c) separation of the dispersion from the anionic exchanger and recovery of the dispersion fluorinated anionic surfactant free,
   wherein in step a), the non fluorinated anionic surfactant is added in an amount from 1% to 10% by weight based on the fluoropolymer dispersion weight, and
   wherein the non fluorinated anionic surfactants are selected from the group consisting of:
   surfactants having the following general formula:

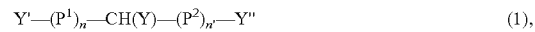

$$Y'-(P^1)_n-CH(Y)-(P^2)_{n'}-Y'' \qquad (1),$$

wherein Y, Y' and Y'' are anionic or nonionic groups, with the proviso that at least one of Y, Y' or Y'' is an anionic group and at least one of the remaining of Y, Y' or Y'' is a nonionic group, $P^1$ and $P^2$, equal or different, are linear or branched, when possible, alkylene groups, optionally containing one or more unsaturations, when possible, having a number of carbon atoms from 1 to 10, and n and n', equal or different, are zero or 1; and
   surfactants having the following general formula:

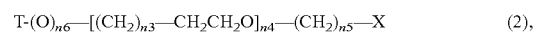

$$T-(O)_{n6}-[(CH_2)_{n3}-CH_2CH_2O]_{n4}-(CH_2)_{n5}-X \qquad (2),$$

wherein T=$C_{4-18}$ alkyl, or aryl wherein one or more hydrogen atoms are substituted with $C_{4-18}$ aliphatic chains, n3 and n6, equal to or different from each other, are integers equal to 0 or 1, n4 is an integer from 0 to 50, n5 is an integer from 0 to 10, and X is an anionic group selected from $COO^-$, $SO_3^-$, with the proviso that when n5=0, X=$SO_3^-$.

2. A process according to claim 1, wherein before step a) the pH of the fluoropolymer dispersion is adjusted at a pH value in the range from 7 to 12.

3. A process according to claim 1, wherein the non fluorinated anionic surfactants usable in step a) are surfactants having a linear or branched structure, having one or more anionic groups.

4. A process according to claim 1, wherein the non fluorinated anionic surfactants have an equivalent weight, defined as molecular weight/number of anionic groups present in the surfactant, higher than 350.

5. A process according to claim 1, wherein the molecular weight of the non fluorinated anionic surfactants is higher than 350.

6. A process according to claim 1, wherein the anionic groups present in the molecule of said non fluorinated surfactants are selected from carboxylates, sulphates, sulphonates, phosphates, phosphonates.

7. A process according to claim 1, wherein the anionic groups of the surfactants of formula (1) are selected from $SO_3^-$, $HPO_3^-$ and $COO^-$.

8. A process according to claim 1, wherein nonionic groups in the surfactants of formula (1) are selected from the group consisting of COOR, CONHR, $CONH_2$, CONRR,
wherein
R and R' equal or different, have the following meanings:
$C_2$-$C_{20}$ hydrogenated alkyls linear or branched, saturated or containing at least one unsaturation; when the alkyl has a number of carbon atoms of at least 6, it can contain one or more aromatic rings; in the alkyl group one or more hydrogen atoms can be substituted by fluorine or chlorine atoms;
siloxane alkyl groups, wherein the alkyl contains from 1 to 7 carbon atoms.

9. A process according to claim 1, wherein in the surfactants of formula (1), the nonionic group is COOR wherein R is as above.

10. A process according to claim 1, wherein the surfactants of formula (1) are selected from the following:
$C_{10}H_{21}OOC$—$CH_2$—$CH(SO_3-)$—$COOC_{10}H_{21}$ di-isodecylsulphosuccinate sodium salt;
$C_{13}H_{27}OOC$—$CH_2$—$CH(SO_3Na)$—$COOC_{13}H_{27}$ di-isotridecylsulphosuccinate sodium salt.

11. A process according to claim 1, wherein the surfactants of formula (2) are selected from the following:
$(C_9H_{17})_2$—$C_6H_3$—O—$[CH_2CH_2O]_{15-20}$—$(CH_2)$—COOH carboxylic dinonylphenolpolyethylenglycOlether acid;
$(C_{12-14}H_{25-29})$—O—$[CH_2CH_2O]_{10}$—$(CH_2)$—COONa $C_{12}$-$C_{14}$-alcohol polyethylenglycol ether (10EO) carboxymethylated sodium salt;
$(C_{12-14}H_{25-29})$—O—$[CH_2CH_2O]_3$—$SO_3Na$ $C_{12}$-$C_{14}$-alcohol polyethylenglycol ether (3EO) sodium salt sulphate.

12. A process according to claim 1, wherein step b) is carried out in a continuous or discontinuous way.

13. A process according to claim 1, wherein the fluoropolymer is a TFE homopolymer or a TFE copolymer modified with monomers having at least one unsaturation of ethylene type and comprising comonomers of hydrogenated and fluorinated type.

14. A process according to claim 1, wherein the fluorinated anionic surfactant is PFOA.

15. A process according to claim 2, wherein the pH of the fluoropolymer dispersion is adjusted at a pH value in the range from 8 to 10.

16. A process according to claim 3, wherein the non fluorinated anionic surfactants usable in step a) are surfactants having a linear or branched structure, having one anionic group.

17. A process according to claim 4, wherein the non fluorinated anionic surfactants have an equivalent weight higher than 600.

18. A process according to claim 5, wherein the molecular weight of the non fluorinated anionic surfactants is higher than 400.

19. A process according to claim 5, wherein the molecular weight of the non fluorinated anionic surfactants is higher than 600.

20. A process according to claim 6, wherein the anionic groups present in the molecule of said non fluorinated surfactants are selected from carboxylates, sulphates, and sulphonates.

21. A process according to claim 1, wherein $P^1$ and $P^2$, equal or different, are linear or branched, when possible, alkylene groups, optionally containing one or more unsaturations, when possible, having a number of carbon atoms from 1 to 6.

22. A process according to claim 1, wherein T=$C_{4-18}$ alkyl, or aryl wherein one or more hydrogen atoms are substituted with $C_{6-12}$ aliphatic chains.

23. A process according to claim 1, wherein n4 is an integer ranging from 1 to 50.

24. A process according to claim 1, wherein n4 is an integer ranging from 2 to 30.

25. A process according to claim 1, wherein n5 is an integer from 0 to 1.

26. A process according to claim 7, wherein the anionic groups of the surfactants of formula (1) are $SO_3^-$.

27. A process according to claim 8, wherein R and R' equal or different are $C_5$-$C_{15}$ hydrogenated alkyls linear or branched, saturated or containing at least one unsaturation.

28. A process according to claim 8, wherein R and R' equal or different are $C_7$-$C_{15}$ hydrogenated alkyls linear or branched, saturated or containing at least one unsaturation.

29. A process according to claim 8, wherein R and R' equal or different are $C_2$-$C_{20}$ hydrogenated alkyls linear or branched, saturated or containing at least one ethylene type unsaturation.

30. A process according to claim 8, wherein in the alkyl group in the $C_2$-$C_{20}$ hydrogenated alkyls, one or more hydrogen atoms can be substituted by hydrogenated (hydrocarbon) alkyl groups.

31. A process according to claim 8, wherein in the alkyl group in siloxane alkyl groups, the alkyl is methyl.

32. A process according to claim 1, wherein in step a) the non fluorinated anionic surfactant is added in an amount comprised from 2% to 5% in percent by weight referred to the fluoropolymer weight.

33. A process according to claim 1, wherein in step a) the non fluorinated anionic surfactant is added in an amount comprised from 2.5% to 4% in percent by weight referred to the fluoropolymer weight.

34. A process according to claim 12, wherein step b) is carried out in a discontinuous way.

35. A process according to claim 14, wherein step b) is carried out by addition of the anionic exchanger or under the form of granules having sizes of about 300-400 micrometers.

36. A process according to claim 13, wherein the amount of comonomer is lower than 3% by weight.

37. A process according to claim 13, wherein the amount of comonomer is lower than 1% by weight.

* * * * *